(12) United States Patent
Cho

(10) Patent No.: US 8,233,360 B2
(45) Date of Patent: Jul. 31, 2012

(54) OPTICAL COLLIMATOR ASSEMBLY AND OPTICAL PICKUP DEVICE INCLUDING THE SAME

(75) Inventor: Won-ik Cho, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/089,179

(22) Filed: Apr. 18, 2011

(65) Prior Publication Data

US 2011/0265105 A1    Oct. 27, 2011

(30) Foreign Application Priority Data

Apr. 21, 2010 (KR) .................. 10-2010-0036842

(51) Int. Cl.
*G11B 7/00* (2006.01)
(52) U.S. Cl. ................................. 369/44.14
(58) Field of Classification Search .... 369/44.14–44.16, 369/44.22; 359/811, 813, 822, 823
See application file for complete search history.

(56) References Cited

U.S. PATENT DOCUMENTS

| | | | |
|---|---|---|---|
| 2009/0070794 A1* | 3/2009 | Hashimoto et al. | 720/658 |
| 2009/0122662 A1* | 5/2009 | Hosoda et al. | 369/44.23 |
| 2009/0288510 A1* | 11/2009 | Latenstein Van Voorst et al. | 74/89.37 |
| 2009/0296543 A1* | 12/2009 | Numata | 369/44.32 |
| 2010/0232265 A1* | 9/2010 | Nakata et al. | 369/44.15 |
| 2010/0271916 A1* | 10/2010 | Oida et al. | 369/47.38 |
| 2010/0271925 A1* | 10/2010 | Yamasaki et al. | 369/112.03 |
| 2011/0182166 A1* | 7/2011 | Tomita et al. | 369/112.24 |

FOREIGN PATENT DOCUMENTS

| | | |
|---|---|---|
| JP | 2006-302389 | 11/2006 |
| JP | 2009-004014 | 1/2009 |
| KR | 10-1999-0033012 | 5/1999 |
| KR | 10-2000-0051248 | 8/2000 |
| KR | 10-2005-0004464 | 1/2005 |
| KR | 10-2005-0082602 | 8/2005 |

* cited by examiner

*Primary Examiner* — Thang Tran
(74) *Attorney, Agent, or Firm* — NSIP LAW

(57) ABSTRACT

An optical collimator assembly used in an optical pickup device and an optical pickup device are provided. The optical collimator assembly may include a collimating lens, a lens holder for supporting the collimating lens, a piezoelectric element coupled to the lens holder and including a female screw portion disposed along a central axis in one direction and a plurality of pairs of piezoelectric bodies disposed symmetrically with one another around the central axis and for causing deformation in a direction that crosses the central axis, and a male screw type transfer screw coupled to the female screw portion of the piezoelectric element.

18 Claims, 6 Drawing Sheets

OPTICAL COLLIMATOR ASSEMBLY AND OPTICAL PICKUP DEVICE INCLUDING THE SAME

CROSS-REFERENCE TO RELATED APPLICATION(S)

This application claims the benefit under 35 U.S.C. §119 (a) of a Korean Patent Application No. 10-2010-0036842, filed on Apr. 21, 2010, in the Korean Intellectual Property Office, the disclosure of which is incorporated herein by reference for all purposes.

BACKGROUND

1. Field

The following description relates to an optical pickup device, and more particularly, to an optical collimator assembly having an improved driving structure and an optical pickup device including the same.

2. Description of the Related Art

Optical drives are configured to optically write information or data to a rotating medium and to read the information or data from the medium. In an optical drive, precise focusing an objective lens that faces a rotating medium is a factor that determines the quality of written and reproduced information. When writing information or data to an optical disc, a thickness between a recording layer and a surface of a disc of any of Blu-ray discs (BDs), high density-digital versatile discs (HD-DVDs), CH-DVDs, and the like that use a light source emitting light having a wavelength of 405 nm (0.1 mm) is smaller than a thickness of any of compact discs (CDs) and DVDs (0.6 mm). Such a thickness difference causes spherical aberration. When spherical aberration increases, a reproducing performance of optical drives is lowered due to an effect of adjacent pits. Further, precise pits cannot be generated during a writing operation. Thus a writing performance of optical drives is also lowered.

Thus, correction of spherical aberration needs to be performed so as to maintain writing and reproducing performances of an optical system. In particular, the importance of aberration correction increases in an optical data storage (ODS) for realizing high definition, such as BDs, HD-DVDs, and the like.

To this end, a collimating lens is often used in an optical disk drive for aberration correction. The collimating lens may be movable on an optical axis. A collimator assembly is a combination of several components including a collimating lens, a lens holder, an actuator for driving the collimating lens, and a structure for supporting the collimating lens, the lens holder, and the actuator.

A stepping motor or a piezoelectric motor is generally used as an actuator for driving a collimating lens. However, in situations where a rotation type stepping motor is configured to have a small size, a torque of the stepping motor decreases. Thus, it is not advantageous to miniaturize a rotation type stepping motor to a predetermined size.

On the other hand, a piezoelectric motor has a structure that performs a simple reciprocating motion using deformation (i.e., contraction and expansion) of a piezoelectric body and requires a high voltage of more than 50 V. Thus, a piezoelectric motor causes an electrical design burden. In addition, a reciprocating motion shaft that supports a collimating lens is mechanically weak.

SUMMARY

In one general aspect, there is provided an optical collimator assembly including a collimating lens, a lens holder for supporting the collimating lens and a piezoelectric element coupled to the lens holder. The piezoelectric element includes a female screw portion disposed along a central axis of the piezoelectric element in one direction and a plurality of pairs of piezoelectric bodies disposed symmetrically with one another around the central axis of the piezoelectric element configured to deform the piezoelectric element in a direction that crosses the central axis. The optical collimator assembly also includes a male transfer screw coupled to the female screw portion of the piezoelectric element.

The piezoelectric element may be shaped as a polygonal column that extends along the central axis.

The piezoelectric element may be shaped as a rectangular column or an octagonal column.

Each of the piezoelectric bodies may be disposed on each of faces of the piezoelectric element shaped as a polygonal column.

Each of the piezoelectric bodies may have a multi-layer structure in which a plurality of unit piezoelectric bodies comprising a piezoelectric material layer and electrodes disposed on opposite sides of the piezoelectric material layer are stacked.

In another aspect, there is provided an optical pickup device including a light source, an objective lens facing an optical medium and disposed on an optical path between the light source and the optical medium and an optical collimator assembly. The optical collimator assembly includes a collimating lens disposed between the objective lens and the light source and for controlling light to be incident on the objective lens, a lens holder for supporting the collimating lens and a piezoelectric element coupled to the lens holder. The piezoelectric element includes a female screw portion disposed along a central axis of the piezoelectric element in one direction and a plurality of pairs of piezoelectric bodies disposed symmetrically with one another around the central axis of the piezoelectric element configured to deform the piezoelectric element in a direction that crosses the central axis. A male screw type transfer screw is coupled to the female screw portion of the piezoelectric element.

The piezoelectric element may be shaped as a polygonal column that extends along the central axis.

The piezoelectric element may be shaped as a rectangular column or an octagonal column.

Each of the piezoelectric bodies may be disposed on each of faces of the piezoelectric element shaped as a polygonal column.

Each of the piezoelectric bodies may have a multi-layer structure in which a plurality of unit piezoelectric bodies comprising a piezoelectric material layer and electrodes disposed on opposite sides of the piezoelectric material layer are stacked.

In another aspect, there is provided a driving mechanism to drive a collimator lens in an optical disk drive, the driving mechanism including a male transfer screw, a piezoelectric element having a female screw portion formed therein to couple with the male screw and a plurality of piezoelectric bodies positioned on the piezoelectric element and configured to deform the piezoelectric element in a direction that crosses a central axis of the piezoelectric element. In response to the deformation of the piezoelectric element by the piezoelectric bodies, either the piezoelectric element rotates relative to the male screw or the male screw rotates relative to the piezoelectric element, thereby moving the piezoelectric elements in a linear direction to drive the collimator lens, which is coupled to the piezoelectric element by a lens holder.

The piezoelectric element may be shaped as a polygonal column extending along the central axis.

Other features and aspects will be apparent from the following detailed description, the drawings, and the claims.

Figure 1:
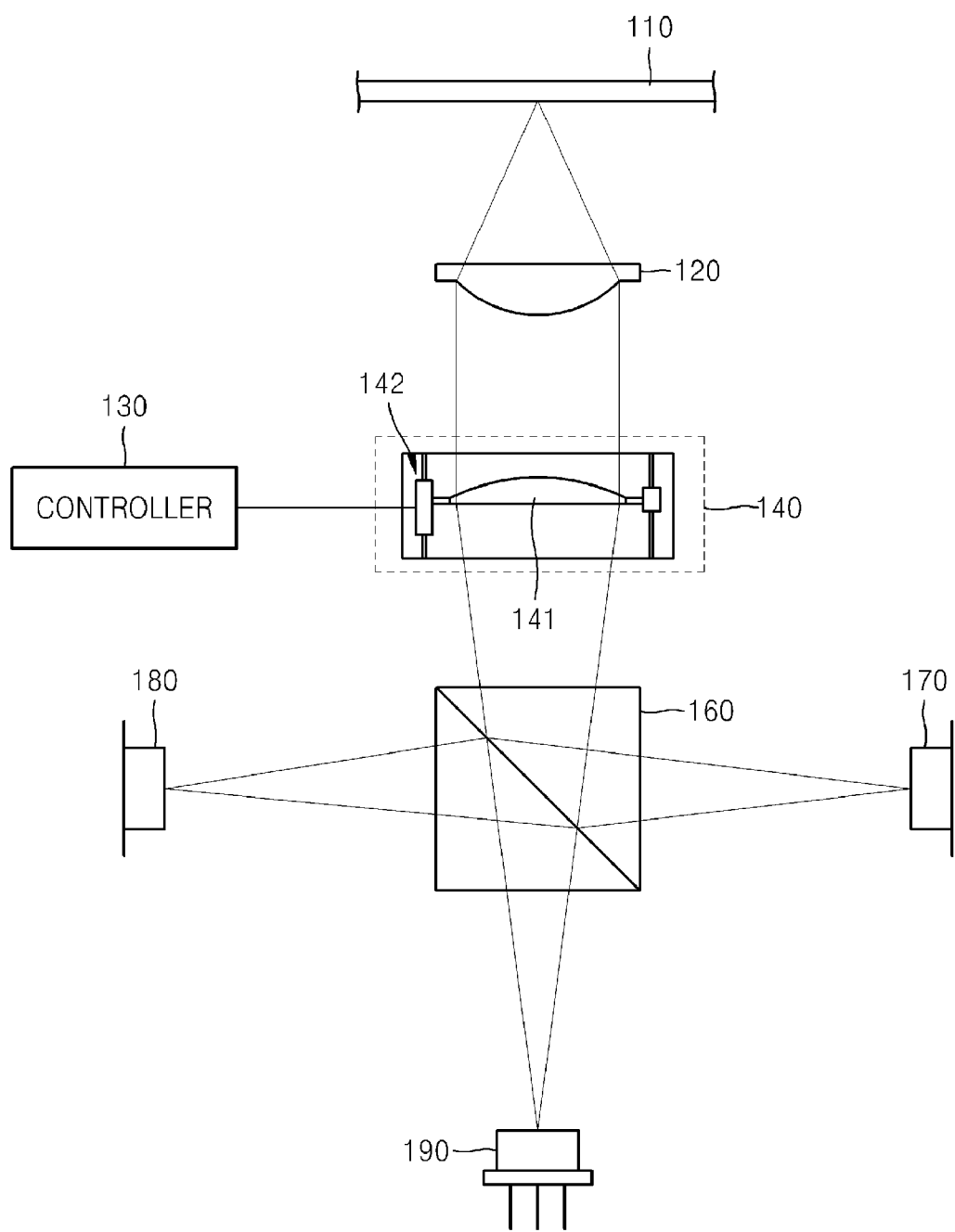
FIG. 1 is a structural schematic diagram illustrating an example of an optical pickup device.

Throughout the drawings and the detailed description, unless otherwise described, the same drawing reference numerals will be understood to refer to the same elements, features and structures. The relative size and depiction of these elements may be exaggerated for clarity, illustration and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates a structural schematic of an example of an optical pickup device.

Referring to the example in FIG. 1, the optical pickup device includes a light source 190 and an objective lens 120 that focuses light emitted from the light source 190 on an information writing surface of a disc-shaped medium 110 (also referred to as a "disc").

The optical pickup device also includes a collimator assembly 140 having a collimating lens 141. The collimator assembly 140 with the collimating lens 141 collimates light emitted from the light source 190. An actuator 142 adjusts a position of the collimating lens 141 along an optical axis and is disposed between the light source 190 and the objective lens 120. The actuator 142 of the collimator assembly 140 is connected to a controller 130 and operates in response to a signal from the controller 130, thereby determining the position of the collimating lens 141 on the optical axis.

The optical pickup device further includes a beam splitter 160 disposed between the collimating lens 141 and the light source 190. The beam splitter 160 reflects light reflected off a disc onto a photodetector 170, reflects a part of light emitted from the light source 190 onto a detector 180 for an optical output monitor, and transmits a remaining part of the light emitted from the light source 190 to the medium or disc 110.

Figure 2:
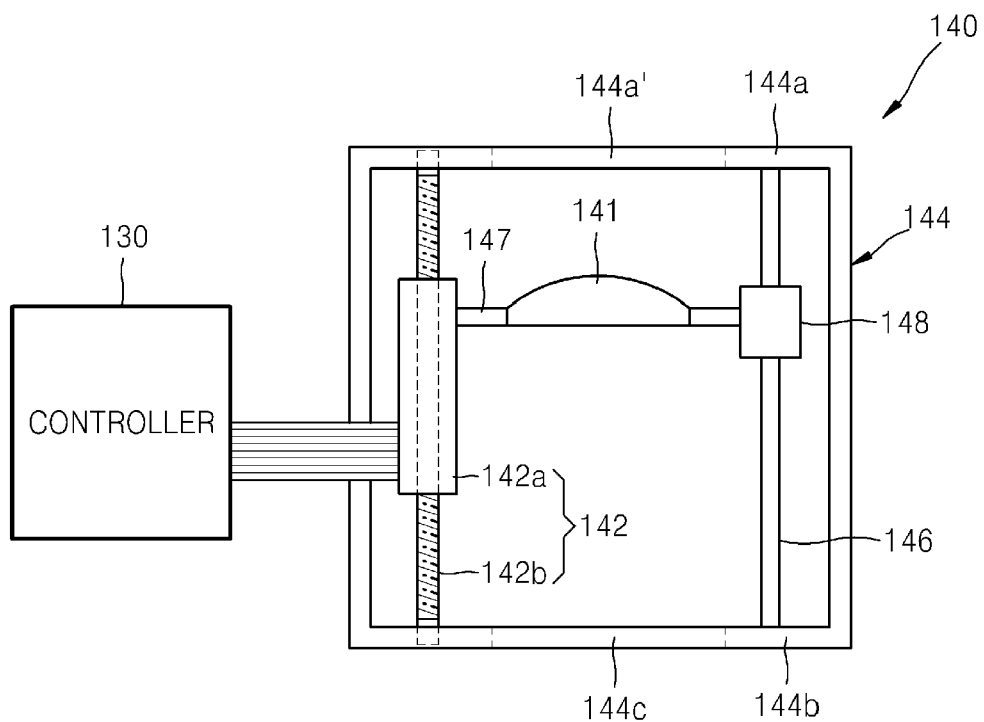
FIG. 2 is a structural schematic diagram illustrating an example of an optical collimator assembly.

FIG. 2 illustrates a structural schematic of an example of the collimator assembly 140.

Referring to the example in FIG. 2, the actuator 142 is disposed in the collimator assembly 140. In contrast to a general actuator (not shown) for the objective lens 120, the actuator 142 includes a piezoelectric element 142a having a female screw portion 142a' (shown in FIG. 3) disposed along a moving axis as a driving source using piezoelectric deformation. A male screw type transfer screw 142b is screw-coupled to the female screw portion 142a' of the piezoelectric element 142a and moves relative to the piezoelectric element 142a due to deformation in a direction that crosses the optical axis.

Meanwhile, the collimating lens 141 is supported by a lens holder 147. One side of the lens holder 147 is coupled to the piezoelectric element 142a, and a bush 148 is disposed on another side of the lens holder 147. The bush 148 is a cylindrical bearing and is coupled to the lens holder 147 so as to be slidable on a guide rail 146 disposed parallel to the transfer screw 142b. Ends of the transfer screw 142b and ends of the guide rail 146 are coupled to first and second plates 144a and 144b of a support bracket 144 disposed on a path in which light emitted from the light source 190 travels. A partial cut portion 144a' and a circular window 144c are respectively disposed on the first and second plates 144a and 144b. The partial cut portion 144a' and the circular window 144c face the collimating lens 141 and allow light to pass therethrough along the optical axis between the beam splitter 160 and the objective lens 120.

Figure 3:
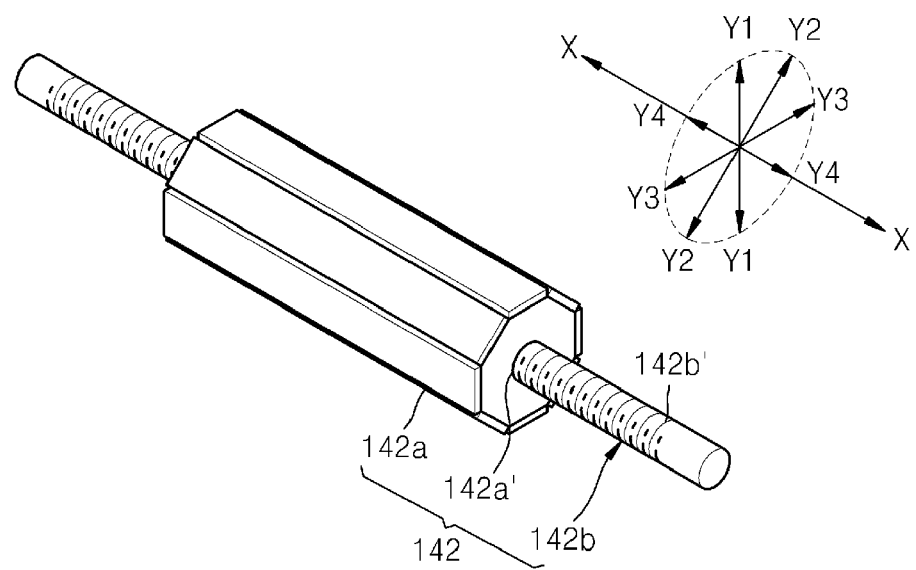
FIG. 3 is a structural schematic diagram illustrating a perspective view of an example of an actuator of the optical collimator assembly illustrated in FIG. 2.

FIG. 3 illustrates a perspective view of a structural schematic of the actuator 142.

Referring to the example in FIG. 3, the transfer screw 142b having a spiral screw thread 142b' formed on an outer surface is coupled to the piezoelectric element 142a shaped as a polygonal column. In the present example, the polygonal column is shown as being octagonal in cross section. However, other suitable polygonal shapes may be employed as well. One of the piezoelectric element 142a and the transfer screw 142b is rotatable, and the other one thereof is fixed and thus not rotatable. Accordingly, one of the piezoelectric element 142a and the transfer screw 142b may rotate relative to the other.

When the transfer screw 142b is rotated and the piezoelectric element 142a is not rotated, but makes a straight reciprocating motion, wiring of the piezoelectric element 142a may be configured to electrically connect the controller 130 to a plurality of piezoelectric bodies (further described below) when a flexible print circuit board (FPCB) is arranged along a moving direction of the piezoelectric element 142a. The plurality of piezoelectric bodies is disposed on the piezoelectric element 142a.

Alternatively, when the transfer screw 142b is fixed and the piezoelectric element 142a is rotated and makes a forward or backward motion, an electrical connection structure between the piezoelectric bodies of the piezoelectric element 142a and the controller 130 may allow the piezoelectric element 142a to rotate. For example, an FPCB that is wound or unwound in the form of a roll in a rotation direction of the piezoelectric element 142a may be used. Or, for example, in an electrical connection structure of a general rotation structure, a plurality of ring-shaped rotators (not shown) may be disposed relatively close to an end of one side of the piezoelectric element 142a at regular intervals. A contact type electrical connection terminal corresponding to the plurality of ring-shaped rotators may also be included, wherein the contact type electrical connection terminal may be positioned in a body that makes a straight motion in synchronization with a reciprocating motion of the piezoelectric element 142a.

When a fixing element and a rotation element are determined in this manner, a design of related elements other than the electrical connection element described above should be properly determined. However, this is a general design matter, and thus, a detailed description thereof is not provided here.

In the current example, the lens holder 147 having one side supported by the guide rail 146, as described above, is fixed to the piezoelectric element 142a and thus the piezoelectric element 142a is not rotated. The piezoelectric element 142a may be deformed in a plurality of directions y1-y1, y2-y2 and y3-y3 that are perpendicular to a transfer direction axis x-x due to a voltage applied by an external device to the piezoelectric element 142a. In this regard, due to the deformation, a rotation force is generated in one direction due to a force applied between the spiral screw thread 142b' of the transfer screw 142b and the female screw portion 142a' of the piezoelectric element 142a. The rotation force is transferred to the transfer screw 142 and causes the rotatable transfer screw 142b to rotate. Thus, movement of the piezoelectric element 142a screw-coupled to the transfer screw 142b causes movement of the collimating lens 141 coupled to the piezoelectric element 142a through the lens holder 147.

In an example where the piezoelectric element 142a rotates relative to the transfer screw 142, the lens holder 147 may be coupled to the piezoelectric element 142a in manner which allows the piezoelectric element to rotate relative to the lens holder 147 as well.

Figure 4A:
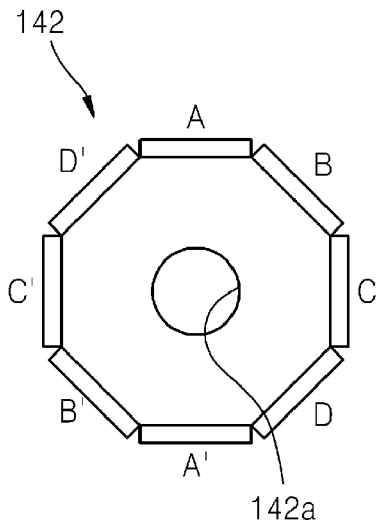
FIG. 4A is a diagram illustrating a cross-section of an example of a piezoelectric element of the actuator of the optical collimator assembly of FIG. 2.
Figure 4B:
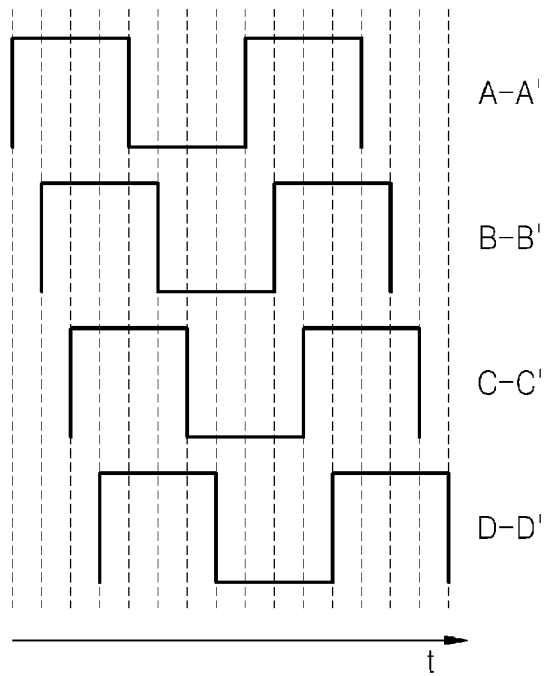
FIG. 4B is a timing diagram illustrating an example of a driving pulse timing for the actuator having the piezoelectric element of FIG. 4A.
Figure 4C:
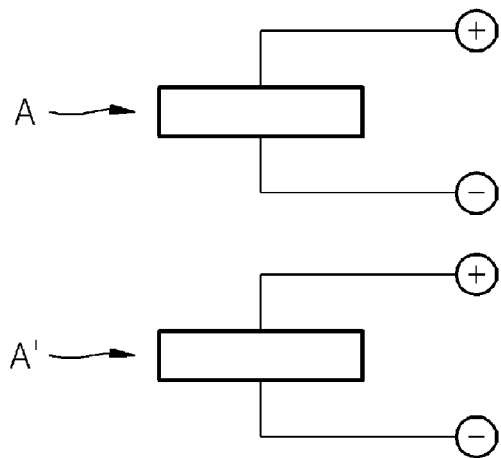
FIG. 4C is a diagram illustrating an example of a structure in which voltages are applied to pairs of piezoelectric bodies disposed symmetrically with one another on the piezoelectric element of FIG. 4A.
Figure 6A:
FIGS. 6A and 6B each illustrate an example of a piezoelectric body disposed on a piezoelectric element.
Figure 6B:
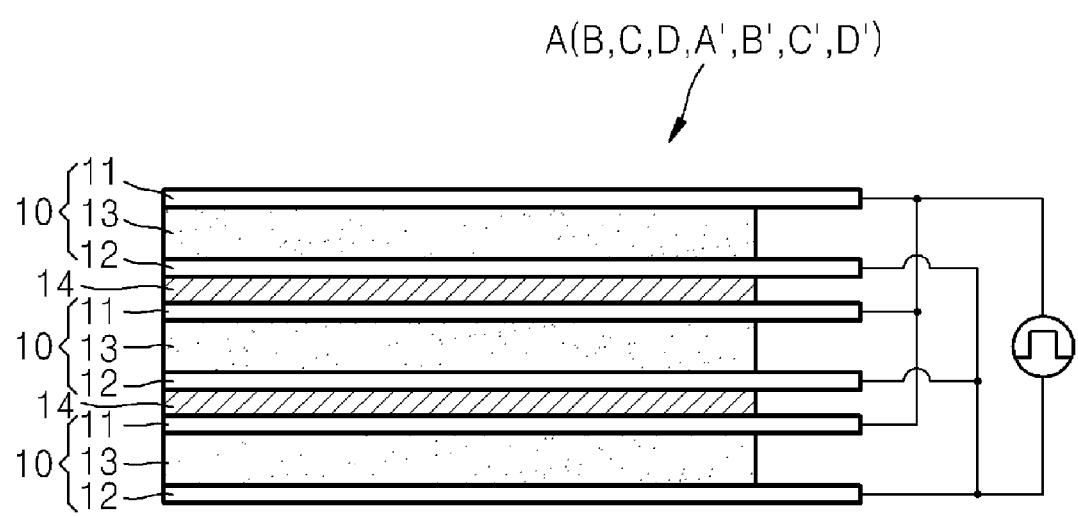

FIG. 4A illustrates a cross-sectional structure of an example of the piezoelectric element 142a having a plurality of pairs of piezoelectric layers disposed symmetrically with one another to perform a force transfer operation. FIG. 4B illustrates an example of timing of a voltage pulse applied to each piezoelectric element. FIG. 4C illustrates an example of a structure in which voltages are applied to pairs of piezoelectric bodies disposed symmetrically with one another on the piezoelectric element 142. FIGS. 6A and 6B each illustrate an example of a piezoelectric body disposed on a piezoelectric element.

Referring to the example in FIG. 4A, a plurality of piezoelectric bodies A, B, C, D, A', B', C' and D' are disposed symmetrically with one another on faces of the piezoelectric element 142a. Here, the piezoelectric element 142a is a column having eight faces, in which the female screw portion 142a' is disposed. Each of a plurality of unit piezoelectric bodies 10 to be applied to the piezoelectric bodies A, B, C, D, A', B', C' and D' includes a piezoelectric material layer 13 and electrodes 11 and 12 disposed on opposite sides of the piezoelectric material layer 13, as illustrated in the example of FIG. 6A. The piezoelectric bodies A, B, C, D, A', B', C' and D' may include a stack of multiple unit piezoelectric bodies 10, which are described further below.

In the actuator 142 having the above structure, a body of the piezoelectric element 142a may be formed of a material that may be properly elastically deformed. For example, the body of the piezoelectric element 142a may be formed of a metal such as stainless steel, copper, or brass, or any of various kinds of plastics. This list of materials is provided for the purposes of example only, and is not limiting. Other suitable materials or combinations of materials may be utilized as well.

The piezoelectric bodies A, B, C, D, A', B', C' and D' may be formed by cutting a piezoelectric sheet including the electrodes 11 and 12, disposed on opposite sides of the piezoelectric material layer 13, to an appropriate size and by attaching the piezoelectric bodies A, B, C, D, A', B', C' and D' to the body of the piezoelectric element 142a. However, in another example, the piezoelectric bodies A, B, C, D, A', B', C' and D' disposed on faces of the piezoelectric element 142a having a polygonal shape may have a multi-layer structure including the unit piezoelectric bodies 10, as described above. In other words, the unit piezoelectric bodies 10 have a structure including the piezoelectric material layer 13 and the electrodes 11 and 12 disposed on opposite sides of the piezoelectric material layer 13. The unit piezoelectric bodies 10 may be stacked in a multi-layer structure, as illustrated in the example of FIG. 6B. In this regard, an insulating layer 14 is interposed between the unit piezoelectric bodies 10 so that electrical interference between the adjacent unit piezoelectric bodies 10 can be prevented. Thus, each of the piezoelectric bodies A, B, C, D, A', B', C' and D' formed on walls of the piezoelectric element 142a and walls of a piezoelectric element 142' illustrated in FIGS. 4A and 5A may include one or more unit piezoelectric bodies 10 as shown in FIGS. 6A and 6B.

A form of a voltage pulse applied for driving is described below. Driving voltage pulses are simultaneously applied to piezoelectric bodies of pairs of facing piezoelectric bodies A-A', B-B', C-C' and D-D'. In this regard, voltages having opposite polarities are applied to the piezoelectric bodies of each of the pairs of piezoelectric bodies A-A', B-B', C-C' and D-D' so that the piezoelectric bodies of each of the pairs of piezoelectric bodies A-A', B-B', C-C' and D-D' may be deformed in a predetermined direction. For example, as illustrated in FIG. 4C, a negative (−) voltage is applied to a piezoelectric body A and a positive (+) voltage is applied to a piezoelectric body A' respectively on sides thereof that face each other. In this case, a positive (+) voltage is applied to the piezoelectric body A and a negative (−) voltage is applied to the piezoelectric body A' respectively on sides thereof that face away from each other. Voltages are applied to each pair in a direction in which a piezoelectric body is to be deformed around a circumference of the piezoelectric element 142a. Referring to FIG. 4B, driving pulses are circulated in the order of (A-A')→(B-B')→(C-C')→(D-D'). In this regard, voltages are continuously applied to all of the piezoelectric bodies A, B, C, D, A', B', C' and D' within a predetermined period so that rotation may be continuously and smoothly performed.

Since continuous voltage pulses as illustrated in FIG. 4B are applied to the piezoelectric element 142 illustrated in FIG. 4A, adjacent piezoelectric bodies represent a ¼ phase difference with respect to each other. In this manner, a proceeding direction (forward or backward) may be determined depending on one of relatively short phases of four piezoelectric bodies. Magnitudes of voltages applied to the piezoelectric bodies are the same, and the voltages applied to piezoelectric bodies that face each other around a transfer screw have opposite polarities. Thus, a pair of piezoelectric bodies that face each other is bent in the form of an arrow in one direction, and then an adjacent pair of piezoelectric elements that face each other is bent in a direction that is slightly rotated from the first direction, so that the piezoelectric bodies can be rotated around the transfer screw 142b. The piezoelectric element 142 in this manner is a kind of 4-phase motor. Proceeding due to a continuous bending operation of the piezoelectric bodies in a predetermined rotation direction using the above principle may be analogized to the principle in which earthworms or snakes move forward by bending their bodies.

Figure 5A:
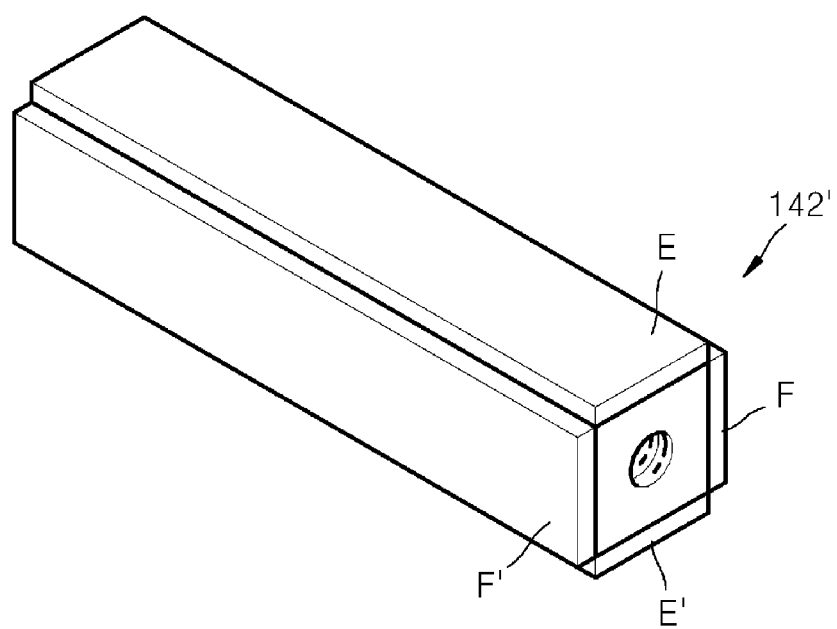
FIG. 5A is a structural schematic diagram illustrating a perspective view of another example of a piezoelectric element of the actuator of the optical collimator assembly of FIG. 2.
Figure 5B:
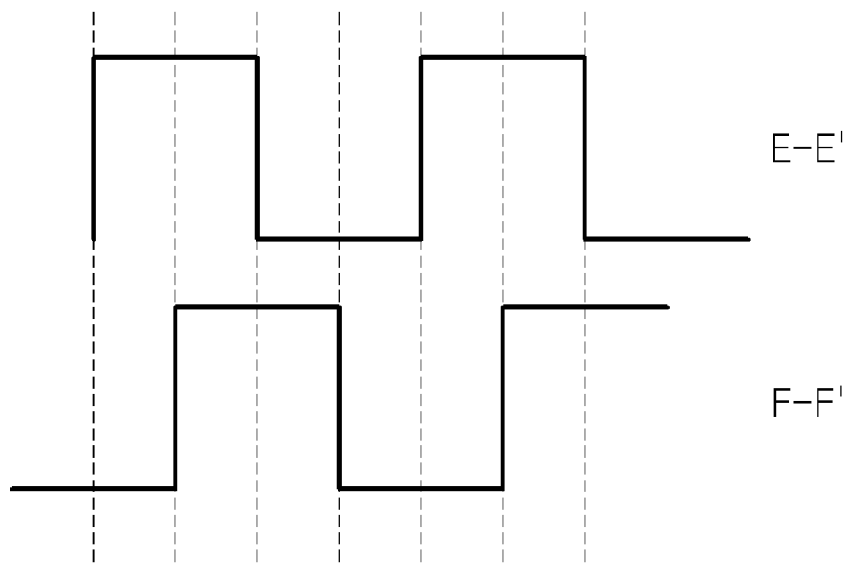
FIG. 5B is a timing diagram illustrating an example of a driving pulse timing for the actuator having the piezoelectric element of FIG. 5A.

FIGS. 5A and 5B respectively illustrate examples of the piezoelectric element 142' having a two-phase motor structure and driving pulse timing applied thereto. As illustrated in FIG. 5A, the piezoelectric element 142' is shaped as a rectangular column and has four faces on which piezoelectric bodies E, F, E', and F' are disposed. Even in the current embodiment, voltages are simultaneously applied to each of facing pairs of piezoelectric bodies E-E' and F-F' in the form described above. Pulses applied to the pairs E-E' and F-F' have a predetermined phase difference and overlap in a partial region.

By using a collimating lens transfer mechanism that may be implemented in various shapes described above, a height of the collimate transfer mechanism may be reduced, and a torque of a motor may be increased. Also, a high-voltage driving mechanism may be implemented as a low-voltage driving mechanism. In particular, 2, 4, and 8 groups of pairs of piezoelectric elements may be disposed so that a unit acceleration and deceleration period is small, a smooth operation may be performed, and fatigue destruction may not occur in the piezoelectric elements and thus a life span of the collimating lens transfer mechanism may be increased.

A voltage pulse of a piezoelectric element having the above structure has 4 phases and may be modified to have, for example, 2 phases, 5 phases, 6 phases, or the like, according to other examples.

A number of examples have been described above. Nevertheless, it will be understood that various modifications may be made. For example, suitable results may be achieved if the described techniques are performed in a different order and/or if components in a described apparatus, system, architecture, device, or circuit are combined in a different manner and/or replaced or supplemented by other components or their equivalents. Accordingly, other implementations are within the scope of the following claims.

What is claimed is:

1. An optical collimator assembly comprising:
   a collimating lens;
   a lens holder for supporting the collimating lens;
   a piezoelectric element coupled to the lens holder, the piezoelectric element comprising:
      a female screw portion disposed along a central axis of the piezoelectric element in one direction; and
      a plurality of pairs of piezoelectric bodies disposed symmetrically with one another around the central axis of the piezoelectric element configured to deform the piezoelectric element in a direction that crosses the central axis; and
   a male transfer screw coupled to the female screw portion of the piezoelectric element.

2. The optical collimator assembly of claim 1, wherein the piezoelectric element is shaped as a polygonal column that extends along the central axis.

3. The optical collimator assembly of claim 2, wherein the piezoelectric element is shaped as a rectangular column or an octagonal column.

4. The optical collimator assembly of claim 2, wherein each of the piezoelectric bodies is disposed on each of faces of the piezoelectric element shaped as a polygonal column.

5. The optical collimator assembly of claim 1, wherein each of the piezoelectric bodies has a multi-layer structure in which a plurality of unit piezoelectric bodies comprising a piezoelectric material layer and electrodes disposed on opposite sides of the piezoelectric material layer are stacked.

6. The optical collimator assembly of claim 2, wherein each of the piezoelectric bodies has a multi-layer structure in which a plurality of unit piezoelectric bodies comprising a piezoelectric material layer and electrodes disposed on opposite sides of the piezoelectric material layer are stacked.

7. The optical collimator assembly of claim 3, wherein each of the piezoelectric bodies has a multi-layer structure in which a plurality of unit piezoelectric bodies comprising a piezoelectric material layer and electrodes disposed on opposite sides of the piezoelectric material layer are stacked.

8. The optical collimator assembly of claim 4, wherein each of the piezoelectric bodies has a multi-layer structure in which a plurality of unit piezoelectric bodies comprising a piezoelectric material layer and electrodes disposed on opposite sides of the piezoelectric material layer are stacked.

9. An optical pickup device comprising:
   a light source;
   an objective lens facing an optical medium and disposed on an optical path between the light source and the optical medium; and
   an optical collimator assembly comprising:
      a collimating lens disposed between the objective lens and the light source and for controlling light to be incident on the objective lens;
      a lens holder for supporting the collimating lens;
      a piezoelectric element coupled to the lens holder, the piezoelectric element comprising:
         a female screw portion disposed along a central axis of the piezoelectric element in one direction; and
         a plurality of pairs of piezoelectric bodies disposed symmetrically with one another around the central axis of the piezoelectric element configured to deform the piezoelectric element in a direction that crosses the central axis; and
      a male screw type transfer screw coupled to the female screw portion of the piezoelectric element.

10. The optical pickup device of claim 9, wherein the piezoelectric element is shaped as a polygonal column that extends along the central axis.

11. The optical pickup device of claim 10, wherein the piezoelectric element is shaped as a rectangular column or an octagonal column.

12. The optical pickup device of claim 11, wherein each of the piezoelectric bodies is disposed on each of faces of the piezoelectric element shaped as a polygonal column.

13. The optical pickup device of claim 9, wherein each of the piezoelectric bodies has a multi-layer structure in which a plurality of unit piezoelectric bodies comprising a piezoelectric material layer and electrodes disposed on opposite sides of the piezoelectric material layer are stacked.

14. The optical pickup device of claim 10, wherein each of the piezoelectric bodies has a multi-layer structure in which a plurality of unit piezoelectric bodies comprising a piezoelectric material layer and electrodes disposed on opposite sides of the piezoelectric material layer are stacked.

15. The optical pickup device of claim 11, wherein each of the piezoelectric bodies has a multi-layer structure in which a plurality of unit piezoelectric bodies comprising a piezoelectric material layer and electrodes disposed on opposite sides of the piezoelectric material layer are stacked.

16. The optical pickup device of claim 12, wherein each of the piezoelectric bodies has a multi-layer structure in which a plurality of unit piezoelectric bodies comprising a piezoelectric material layer and electrodes disposed on opposite sides of the piezoelectric material layer are stacked.

17. A driving mechanism to drive a collimator lens in an optical disk drive, the driving mechanism comprising:
   a male transfer screw;
   a piezoelectric element having a female screw portion formed therein to couple with the male screw; and a plurality of piezoelectric bodies positioned on the piezoelectric element and configured to deform the piezoelectric element in a direction that crosses a central axis of the piezoelectric element;

wherein, in response to the deformation of the piezoelectric element by the piezoelectric bodies, either the piezoelectric element rotates relative to the male screw or the male screw rotates relative to the piezoelectric element, thereby moving the piezoelectric elements in a linear direction to drive the collimator lens, which is coupled to the piezoelectric element by a lens holder.

18. The driving mechanism of claim 17, wherein the piezoelectric element is shaped as a polygonal column extending along the central axis.

* * * * *